United States Patent [19]
Crowe

[11] 3,757,735
[45] Sept. 11, 1973

[54] VACUUM HOLDER TO CONFORM CASTING SURFACE

[75] Inventor: Gordon Appling Crowe, Ann Arbor, Mich.

[73] Assignee: BASF Wyandotte Corporation, Wyandotte, Mich.

[22] Filed: Feb. 2, 1973

[21] Appl. No.: 329,232

Related U.S. Application Data

[62] Division of Ser. No. 119,522, March 1, 1971, Pat. No. 3,728,777.

[52] U.S. Cl............... 118/50, 269/21, 425/388
[51] Int. Cl............................................. B05c 11/14
[58] Field of Search................... 118/500, 503, 50, 118/50.1; 425/388; 269/21

[56] References Cited
UNITED STATES PATENTS
2,931,064  4/1960  Matoba............................. 425/388
3,482,281  12/1969  Thiel................................ 425/388 X
3,554,834  1/1971  Bennett et al.................... 118/50 UX Primary Examiner—Morris Kaplan
Attorney—Robert M. Phipps et al.

[57] ABSTRACT

A process and apparatus are provided for flattening a metal sheet having a sinuous cross-section while it is supported from below against buckling by withdrawing air from beneath the sheet until atmospheric pressure above the sheet firmly presses it against the support substantially free from undulations and for casting a film of substantially uniform thickness on the exposed surface of the flattened sheet.

5 Claims, 3 Drawing Figures

PATENTED SEP 11 1973 3,757,735

VACUUM HOLDER TO CONFORM CASTING SURFACE

This is a division of application Ser. No. 119,522, filed Mar. 1, 1971, now U.S. Pat. No. 3,728,777.

This invention relates generally to the casting of films and more particularly to an improved apparatus for casting relatively thin films of substantially uniform thickness wherein a liquid is spread over a surface and allowed to solidify.

Various methods and apparatus have been suggested for preparing films and coatings by spreading a material over a surface while it is liquid and maintaining it in its spread state until it solidifies. The resulting coating may be left on the surface as a coating or it may be removed and used as a self-sustaining film. For example, self-sustaining sheets of polyurethane are often formed by casting a liquid reaction mixture over the surface of a relatively thin metal sheet coated with mold release agent and, after chemical reaction and solidification of the mixture, removing the resulting film from the metal sheet. In those instances where it is desirable to produce a coated sheet, mold release agents are not used and the film is not removed from the sheet.

Of the various processes suggested for making such products the one most often used commercially, particularly for preparing polyurethane films, involves pouring a liquid castable reaction mixture over the surface of the sheet while it lies on the heated surface of a casting table and, after the resulting film has solidified, removing the metal sheet from the casting table. More specifically, in preparing an adherent coating, a relatively thin metal sheet may be sand blasted, coated with a bonding agent and clamped or otherwise securely fastened to the surface of a heated casting table. Metal bars are placed on the sheet to form "picture frame" type mold walls enclosing the area of the sheet to be coated. The correct volume of liquid urethane reaction mixture or other suitable solidifiable mixture is poured over the surface of the enclosed area while it is still sufficiently fluid to seek a common level. After solidification the metal sheet is removed from the table and the film is removed therefrom.

Such a process is relatively simple and has many advantages but has the disadvantage of often not producing a film of uniform thickness particularly when the metal sheet and the film cast thereon are relatively thin. Even the highest quality stretcher-levelled thin sheet metal is not truly flat. It usually has many bends, bulges and ripples which because of its inherent springiness will remain unless held firmly against a flat surface. Frequently, such a sheet will have waves or undulations of a depth equal to or greater than the thickness of the film to be cast on the surface of the sheet. Consequently, the liquid layer poured over the surface will flow into low spots and produce puddles here and there and leave thin layers of liquid or no liquid at all at the high spots. Attempts have been made to hold the sheet flat with the bars used as a mold frame but the sheet still has a sinuous cross-section in the area enclosed by the bars. Weights have also been placed over the entire sheet with only small points spaced here and there touching the metal sheet within the area enclosed by the bars, but the coating has a void for each point which must later be filled by patching. The product has a patched appearance.

It is therefore an object of this invention to provide an apparatus for casting films which is devoid of the disadvantages of the prior art processes. Another object of the invention is to provide an improved apparatus for casting films prepared by shaping a liquid and effecting solidification thereof. Still another object of the invention is to provide an apparatus for maintaining a metal sheet having a sinuous cross-section flat while a liquid is cast and solidified thereon. A further object of the invention is to provide an apparatus of simple and inexpensive construction adapted to flatten a relatively thin flexible metal sheet having a sinuous cross-section. A more specific object of the invention is to provide a simple but effective apparatus for casting relatively thin films of synthetic resins or the like of substantially uniform thickness over a metal sheet having a surface which under normal conditions is not perfectly flat.

Other objects will become apparent from the following description with reference to the accompanying drawing wherein FIG. 1 is a plan view, partially fragmentary, of one embodiment of the invention;

Figure 1:
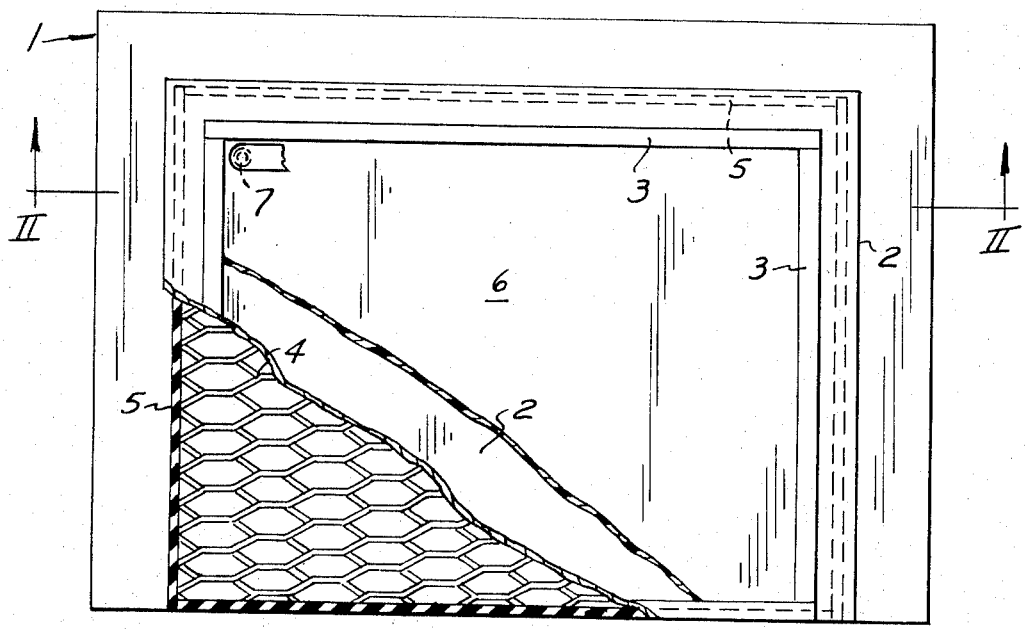
Figure 2:
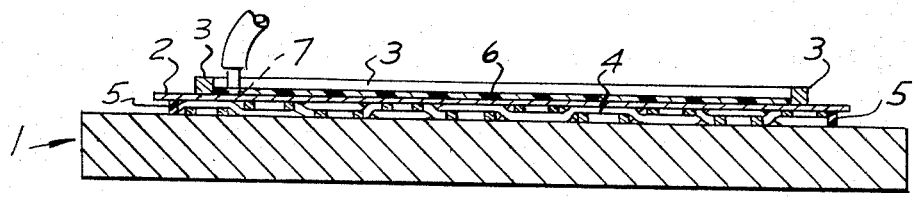
FIG. 2 is a cross-section taken along the line II—II of FIG. 1.
Figure 3:
FIG. 3 is an exaggerated illustration of the edge of a metal sheet having a sinuous cross-section adapted to be flattened in accordance with this invention.

The objects of the invention are accomplished, generally speaking, by providing an apparatus for supporting a sheet having a sinuous cross-section and evacuating the region below the sheet until the sheet because of the difference in pressure above and below the sheet is pressed against the support in a flattened condition. In other words, the sheet is supported to prevent buckling downwardly as air is withdrawn and is consequently straightened or leveled by atmospheric pressure which forces it firmly against the various spaced points of the support which are in contact with the underside of the sheet.

In a preferred embodiment of the invention, a thin metal sheet is sand blasted or otherwise cleaned by conventional methods prior to coating. A gasket is adhesively secured around the periphery of the underside of the sheet leaving an open region therebetween. A piece of expanded metal which has not been flattened after expansion and has been cut to dimensions corresponding substantially to the dimensions of the open region is placed on the surface of a level casting table. The sheet is then placed over the casting table with the gasket about the expanded metal and resting on the casting table. A hole is drilled in one corner of the sheet to provide for passage of one end of a tube into the open region under the expanded sheet. The other end of the tube is attached to the suction side of a blower, to a vacuum pump or a combination thereof. Air is withdrawn from the region under the sheet until the air pressure above the sheet is sufficiently greater than that within the region to firmly press the sheet against the upper most points of the expanded metal and to flatten the surface of the sheet by removal of any undulations therein. A coating is then cast over the surface of the flattened sheet by pouring a liquid thereover and continuing to maintain the vacuum until the liquid has solidified.

Referring now to the drawing, a substantially air impervious rubber gasket 5 is adhesively bound around the periphery of the underside of a flexible relatively thin steel sheet 2. One-half inch wide by 3/16 inch thick foam rubber weather stripping of the type available commercially for weather stripping doors and windows of a residence may be used to form gasket 5. Most stripping has one surface coated with a pressure sensitive adhesive which may be used to bind the stripping to the sheet. A sheet of unflattened diamond patterned expanded metal 4 having a maximum thickness of about one-eighth inch and a length and width about equal to those of the region enclosed by gasket 5 is placed on the surface of a heated substantially level casting table 1. The assembly of sheet 2 and gasket 5 are positioned over table 1 with gasket 5 surrounding the expanded metal sheet 4. Steel rods 3 are positioned on the exposed surface of sheet 2 in the desired configuration and dimensions. The weight of sheet 2 and rods 3 compress gasket 5 until it is about equal in thickness to the thickness of sheet 4. One end of a suitable tubing is passed through opening 7 into the region of expanded metal sheet 4 and is connected at its other end to a means for removing air from the region, such as an aspirator, vacuum pump, suction fan or the like. Air is withdrawn from the said region until the pressure above sheet 2 is sufficiently greater than that below sheet 2 to firmly press sheet 2 against sheet 4, remove any undulations therein resulting from its sinuous cross-section and thereby flatten the expanded surface of sheet 2. While maintaining less than atmospheric pressure below sheet 2, a liquid mixture which will solidify into a substantially non-porous polyurethane coating 6 is poured in the required volume over the exposed surface of sheet 2 within the area defined by rods 3. After solidification of the polyurethane, air is permitted to flow into the space defined by gasket 5, the rods 3 are removed and sheet 2 is removed from the casting table 1. If sheet 2 is used as a casting surface for a film which is to be removed therefrom and used as a self-sustaining film, sheet 2 and the inner walls of rods 3 are coated with a suitable mold release before the reaction mixture is poured over sheet 2 to facilitate separation of the cast film from sheet 2. Any suitable mold release known in the art may be used such as a wax, a silicone or one of the mold release agents disclosed in the Saunders and Frisch book, identified more specifically hereinafter, if the film is to be removed from the metal sheet. Any known suitable bonding agent may be used in preparing an adherent coating on a metal sheet.

The process and apparatus provided by the invention may be used to cast any liquid which will solidify into a product which is a solid at 20° C., such as, for example, molten paraffin wax, beeswax or other wax, a liquid urethane reaction mixture, any molten resinous material or the like. Suitable mixtures for casting self-sustaining polyurethane films or adherent coatings on a sheet are disclosed, for example, in the book entitled *Polyurethanes: Chemistry and Technology* by Saunders and Frisch, published by Interscience Publishers, Copyright 1962, Library of Congress Card Number 62-18932. Any of the formulations disclosed in this book for making coatings or castings may be used. Any other liquid which when poured over the surface of the sheet is sufficiently fluid to seek a common level on a flat surface and will solidify into a film which is solid at 20° C. may be used.

While best results have been obtained so far with an expanded metal sheet any other support which will not block flow of air from under the sheet 2 and will provide sufficient support to prevent buckling or collapse of sheet 2 when air is withdrawn from under sheet 2 may be used in combination with an air impervious wall thereabout. For example, a labyrinth formed by positioning metal bars or strips of a thickness substantially equal to the thickness of gasket 5 when it is supporting sheet 2 may be used provided passageways are available for flow of air from under sheet 2. Other porous materials such as a sheet of open celled rigid polyurethane foam or styrene foam may also be used. Usually the thickness of gasket 5 and of the air pervious material cooperating therewith to support sheet 2 is relatively thin and often a quarter of an inch or less. Expanded metal sheets are fabricated by first cutting a plurality of slits in a sheet and then stretching the metal to separate the walls of the slits and form a polygonal shaped opening similar to that shown in the drawing. The strips of metal between the openings do not all lie in the same plane so sometimes the product is pressed to flatten it before it is used for a screen, a cat-walk, steps or the like. However, since some thickness is desired and blockage against air flow is to be avoided, unpressed or unflattened expanded metal is used in this invention. A suitable fitting or plug may be used to provide an air impervious fitting between the tubing and opening 7. Although it is preferred to adhesively bind gasket 5 to the metal sheet, in some instances the adhesive can be omitted.

The invention is primarily advantageous for coating sheet metal, such as, steel, aluminum, brass and the like, but it may also be practiced to coat any other flexible substrate which has a sinuous cross-section, such as, sheets of various plastic or resinous materials.

In the preferred embodiment of the invention, described above, air may be first withdrawn from under sheet 2 with the suction side of a fan type blower such as a portable vacuum cleaner or similar apparatus capable of withdrawing a relatively large volume of air rapidly. This facilitates seating the gasket against the surface of the casting table and sealing the region enclosed by the gasket. After the gasket is seated against the table, a vacuum pump capable of removing substantially all of the air from under sheet 2 may be cut in to continue withdrawing air until the sheet is firmly pressed against the expanded metal sheet and any undulations have been removed. One arrangement of apparatus suitable for this embodiment employs a two-way valve in the tubing extending from hole 7 with a vacuum cleaner and a vacuum pump attached through suitable tubing to the valve.

The invention is applicable to the coating of relatively large sheets as well as smaller ones. Sheet steel 4 × 8 feet and about one-sixteenth inch thick and larger may be coated by the process with coatings as thin as one-sixteenth inch or less. The formulations and processing steps in Chapter X, Section IV, of the Saunders and Frisch book, Part II, may be used in combination with the flattening step of this invention.

Although the invention has been described in detail for the purpose of illustration, it is to be understood that such detail is solely for that purpose and that variations can be made by those skilled in the art without departing from the spirit and scope of the invention except as it may be limited by the claims.

The embodiments of the invention in which an exclusive property or privilege is claimed are defined as follows:

1. In combination, an apparatus comprising a support having a substantially air impervious surface, a substantially air impervious wall extending upwardly from the support and about a region having an open top, air pervious means within said region providing a plurality of points spaced upwardly above the impervious surface a distance substantially equal to the height of the wall whereby a substantially flat cover over the open top would be supported by the wall and the points, a flexible sheet having a sinuous cross-section covering the open top, and means for withdrawing air from the region until the undulated sheet is substantially flattened against the support.

2. The apparatus of claim 1 wherein the wall is a gasket adhered to the under surface of the flexible sheet and the air pervious means is an unflattened, expanded metal sheet.

3. The apparatus of claim 2 wherein the sinuous sheet is metal.

4. The apparatus of claim 3 wherein the means for withdrawing air is a combination of an exhaust fan adapted to remove large volumes of air rapidly and a vacuum pump adapted to reduce the air pressure to a point where it approaches a complete vacuum.

5. In combination, an apparatus comprising a support having a substantially air impervious surface, a substantially air impervious wall extending upwardly from the support and about a region having an open top, air pervious means within said region providing a plurality of points spaced upwardly above the impervious surface a distance substantially equal to the height of the wall whereby a substantially flat cover over the open top would be supported by the wall and the points, a flexible sheet having a sinuous cross-section covering the open top, means for withdrawing air from the region until the undulated sheet is substantially flattened against the support, means for heating the sheet and a means for casting a film over the surface of the sheet.

* * * * *